July 4, 1939.  E. O. SCHJOLIN  2,164,475
HYDRAULIC THROTTLE CONTROL
Filed May 22, 1937
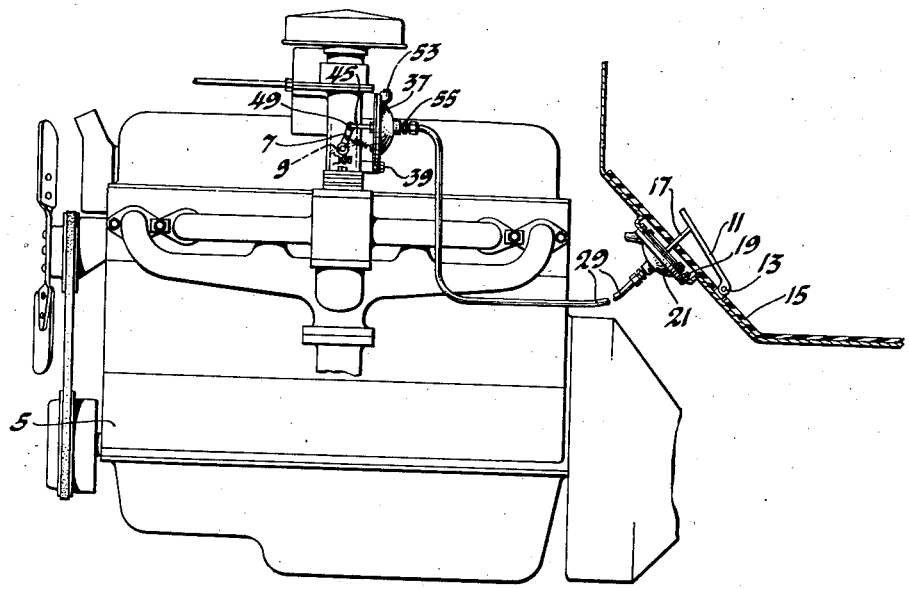
Fig. 1
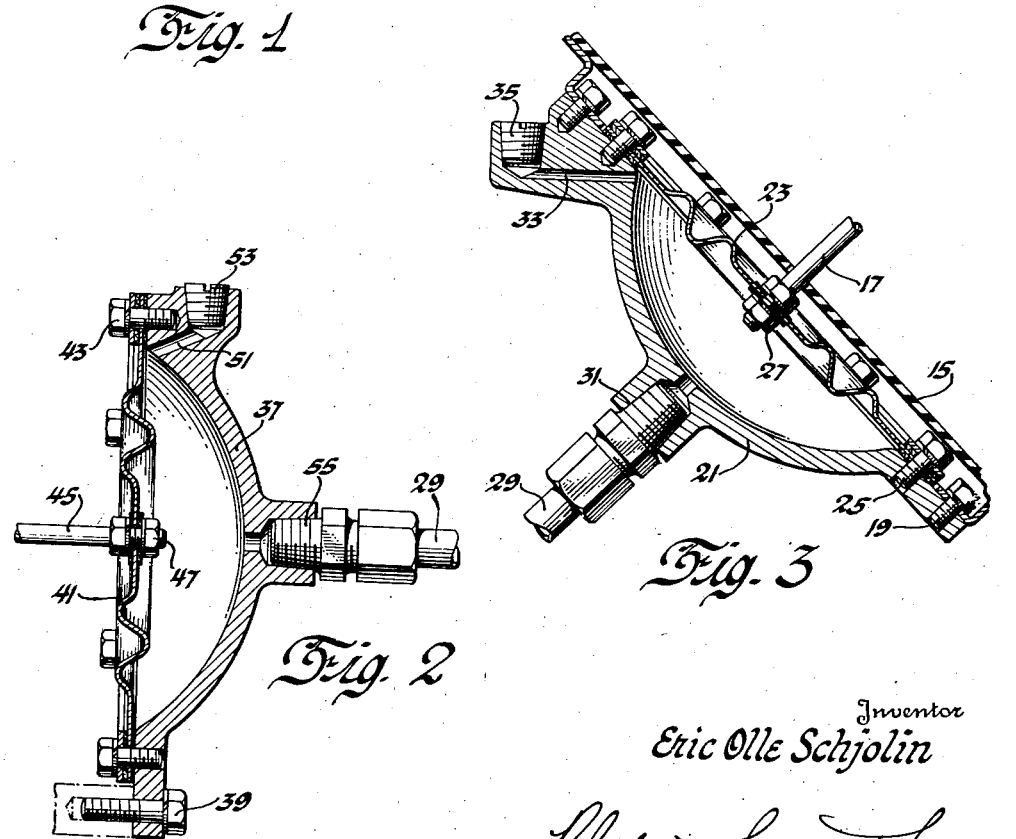
Fig. 2
Fig. 3
Inventor
Eric Olle Schjolin
By Blackmore, Spencer & Flint
Attorneys Patented July 4, 1939

2,164,475

UNITED STATES PATENT OFFICE 2,164,475

HYDRAULIC THROTTLE CONTROL

Eric Olle Schjolin, Pontiac, Mich., assignor to General Motors Corporation, Detroit, Mich., a corporation of Delaware Application May 22, 1937, Serial No. 144,251

2 Claims. (Cl. 74—513)

This invention relates to the control means for an internal combustion engine. In addition to other uses it has been designed especially for use with such an engine installed on a motor vehicle.

An object of the invention is to improve the mechanism whereby a manually applied lever moves the throttle valve of the engine.

A further object involves the omission of the mechanical linkage between the accelerator pedal and throttle valve and the substitution therefor of a movable hydraulic column.

As a further object the invention contemplates the use of a first diaphragm to impress movement upon a second diaphragm through the instrumentality of a hydraulic column, the second diaphragm operable to move the throttle valve. In the preferred form the latter diaphragm offers considerably greater resistance to movement than the first diaphragm whereby the expansion and contraction of the liquid medium under the influence of temperature changes may for the most part affect the first diaphragm rather than the second. The substitution of such a movable hydraulic column in place of a mechanical linkage may be of especial use where the engine is quite far removed from the passenger compartment, as for example, in the case of a rear engine installation. Under such circumstances the friction losses incidental to the considerable length of mechanical linkage are avoided.

Other objects and advantages will be understood from the following specification.

The invention is illustrated in the accompanying drawing in which:

Figure 1 is a view in side elevation showing the inventive idea associated with parts of the motor vehicle.

Figure 2 is a transverse section through one chambered member.

Figure 3 is a transverse section through a second chambered member.

Referring by reference characters to the drawing, numeral 5 is applied to the power plant and numeral 7 represents a lever operably connected to the throttle valve 9. Within the passenger compartment a lever or accelerator pedal 11 is pivoted at 13 to the floor board 15. Downward movement of lever 11 pushes a stem 17.

The connection between stem 17 and lever 7 is hydraulic in character. Secured to the floor board 15 by fastening means 19 is a chambered member 21, the open side of which is covered by a flexible diaphragm 23, the latter secured by fastening means 25. To the center of the diaphragm the stem 17, above referred to, is secured by nuts 27. The conduit 29 is secured to an opening 31 in the center of the dome portion of the chamber 21. The wall of the chambered member is also provided with a passage 33 for filling with fluid or for bleeding air. The passage is normally closed by plug 35.

A similar second chambered member 37 is secured to the engine adjacent the throttle valve by fastening means 39. It has a diaphragm 41 secured over its open side by fastening means 43. A stem 45 is secured to the center of the diaphragm by nuts 47 and this stem is pivotally connected to lever 7 at 49. A passage 51 and plug 53 are also provided as in the case of member 21. The conduit 29 is connected to the member 37 at 55.

The chambers and the conduit are to be filled with a suitable fluid transmitting medium. Depression of pedal 11 operates through the instrumentality of stem 17 to collapse the diaphragm 23 toward its dome portion and thereby decrease the capacity of this chamber. The fluid forced therefrom, passes through conduit 29 into chamber 37 and thus flexes diaphragm 41 to increase the capacity of this second chamber. The stem 45 thereupon rocks the lever 7 in the act of opening the throttle valve. Suitable spring means serves to restore the throttle valve to its idling position.

It will be observed from the drawing that diaphragm 41 is of greater thickness than diaphragm 23. It therefore resists forces tending to flex it more than does diaphragm 23. When temperature changes cause contraction and expansion of the fluid the diaphragm 23 will be the one mainly affected and little, if any effect will be produced upon the position of the throttle valve.

I claim:

1. For use with an engine having a throttle valve, an actuating means to move said valve, a remotely positioned throttle valve operating member, fluid transmission means between said actuating means and said member, said transmission means including a conduit, a first chambered member at one end of the conduit, said chambered member having a closure diaphragm and a stem, the stem adapted to be connected to said actuating means, and a second chambered member at the other end of said conduit, said second chambered member being provided with a diaphragm and stem, the last named stem adapted to be moved by said member, the diaphragm of the first chambered member being more resistant to movement than the diaphragm of the second chambered member.

2. In fluid operating controlling mechanism, a closed system including a conduit for a movable column of fluid, a chambered member having a movable diaphragm forming one wall of said chamber at a first end of said conduit whereby fluid may be displaced through said conduit, a chambered member having a second diaphragm forming a closure therefor at the opposite end of said conduit, said second diaphragm adapted to be moved by said displaced fluid, said last named diaphragm adapted to be operably connected to said throttle operating means and said first diaphragm adapted to be operably connected to manually operable means, said diaphragms being unequally resistant to movement under the influence of expansion and contraction of the fluid.

ERIC OLLE SCHJOLIN.